P. D. WELLS.
BAKING PAN.
APPLICATION FILED MAR. 29, 1916.
1,223,226.                                  Patented Apr. 17, 1917.
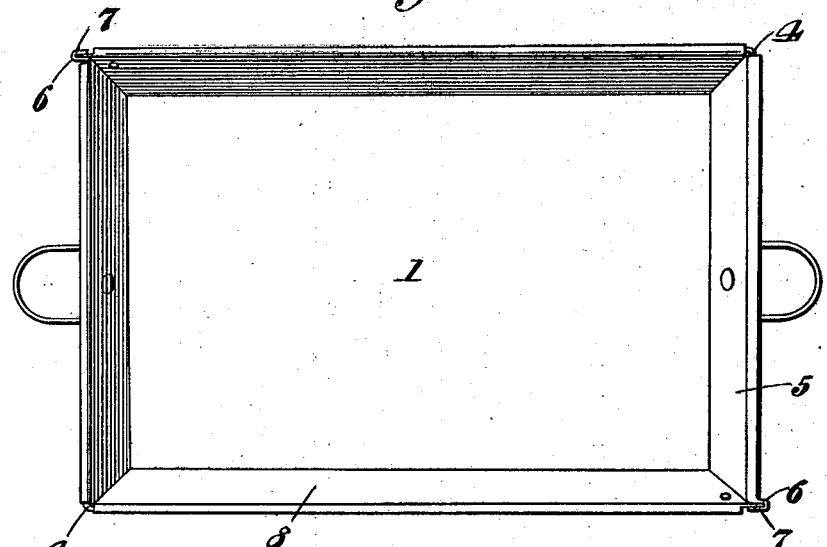
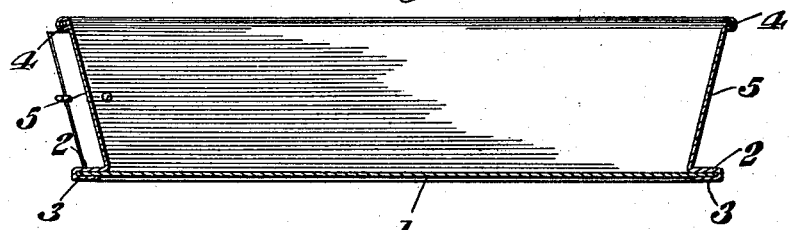
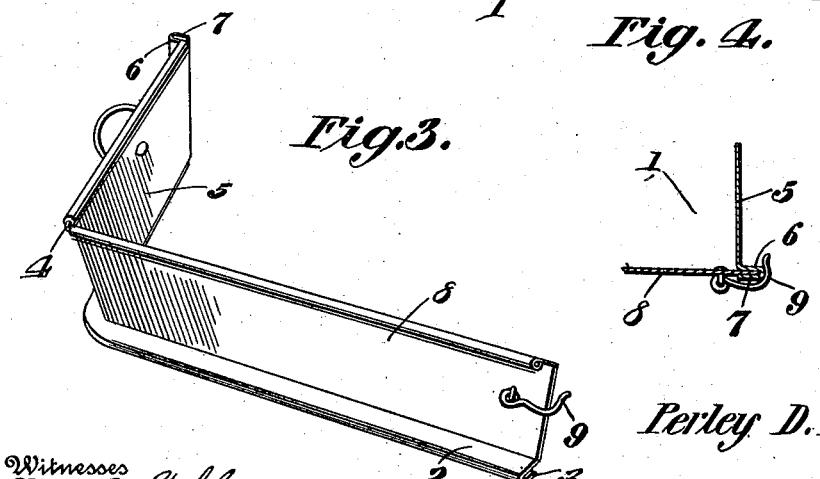
Inventor
Perley D. Wells,
By Victor J. Evans
Attorney
Witnesses
Louis A. Stabler
L. Wilcox.

UNITED STATES PATENT OFFICE.

PERLEY D. WELLS, OF MILO, MAINE.

BAKING-PAN.

1,223,226.  Specification of Letters Patent. Patented Apr. 17, 1917.

Application filed March 29, 1916. Serial No. 87,530.

*To all whom it may concern:*

Be it known that I, PERLEY D. WELLS, a citizen of the United States, residing at Milo, in the county of Piscataquis and State of Maine, have invented new and useful Improvements in Baking-Pans, of which the following is a specification.

This invention relates to baking pans and it consists in the novel features hereinafter described and claimed.

An object of the invention is to provide in a pan of the character indicated means whereby the side and end walls may be separated from the bottom and thus remove from about the edges of a cake in order that the cake may remain upon the bottom panel of the pan until it has sufficiently cooled and hardened.

With the above object in view the pan includes side and end wall sections connected together there being means for connecting the two sets of sections together in a manner that they may be readily separated from each other when desired. The side and end wall sections are provided at their lower edges with folds and flanges which receive the bottom panel of the pan and support the same while the pan is in use for baking a cake.

In the accompanying drawing:—

Figure 1 is a top plan view of the pan.

Fig. 2 is a longitudinal sectional view of the same.

Fig. 3 is a perspective view of a portion thereof;

Fig. 4 is a fragmentary sectional view through a corner thereof.

The pan includes a flat bottom panel 1. Side wall sections and end wall sections are provided at their lower portions with outwardly disposed folds 2 which are inwardly bent from their outer portions constituting flanges 3. The inner surfaces of the flanges 3 are spaced from the adjacent surfaces of the folds and the spaces between the flanges and the folds are adapted to receive the edge portions of the bottom panel 1 as best shown in Fig. 2 of the drawing. One end wall is connected with one of the side walls by means of a wire 4 which is curled in the upper edge portions of the said walls in the usual manner. It requires two sets of end and side walls to completely surround the bottom panel 1. Each end wall 5 is provided at one end with an outwardly disposed fold 6 and from the outer portion of the said fold the material is extended back forming a flange 7. The inner surface of the flange 7 is spaced from the adjacent surface of the fold 6 and the said space is adapted to receive the end portion of the adjacent side wall 8. Hooks 9 are pivotally mounted at the outer surfaces of the side walls 8 and the bill ends of the said hooks are engageable against the outer portions of the folds 6 and 7 and serve as means for holding the end portions of the side walls 8 in the spaces between the folds 6 and 7.

After a cake has been baked in the pan and when it is desired to remove the same the hooks 9 are disengaged from the flanges 7 and the folds 6 and then the side walls 8 and end walls 5 are slipped off of the edges of the bottom panel 1 thus leaving the cake in position upon the said panel. After the cake has become sufficiently cool and has hardened it may be readily removed from the bottom panel 1. In the meantime the side walls 8 and end walls 5 which have been removed from one panel 1 may be applied to another similar panel and the side and end walls may be repeatedly used for baking several cakes while each individual cake is permitted to cool and harden upon that bottom panel upon which it was baked.

From the foregoing description taken in conjunction with the accompanying drawing it will be seen that a collapsible baking pan of simple and durable structure is provided and that the side and end walls may be readily detached from the bottom panel of the pan in order to permit the cake to properly cool and harden upon the bottom panel before it is removed from the same. This prevents the cake from being injured or broken during the process or operation of removing it from the pan.

Having described the invention what is claimed is:

1. A baking pan comprising a bottom panel, side and end walls provided at their lower portions with outstanding folds and return flanges, the said flanges being spaced from the folds and adapted to receive the edge portions of the bottom panel, the side and end walls being connected together in sets, one member of each set of the side and end walls having an outstanding fold with a return flange spaced from the same the spaces between the said fold and flanges being adapted to receive end portions of members of the other set of side and end walls and means for holding the side and end walls of one set in engagement with the folds and flanges of the other set of side and end walls.

2. A baking pan comprising a bottom panel, side and end walls having at their lower portions outstanding folds with return flanges spaced from the folds, the spaces between the said folds and flanges adapted to receive the edge portions of the bottom panel, the said side and end walls being connected together in sets, one member of each set being provided with an outstanding fold and a return flange spaced from the fold, the space between the last mentioned fold and flange adapted to receive end portions of members of the other side and end walls, and hooks mounted upon the said walls and engageable with the said folds and flanges to hold the walls in close contact with each other.

In testimony whereof I affix my signature in presence of two witnesses.

PERLEY D. WELLS.

Witnesses:
HARRY W. STURTEVANT,
ROSE STURTEVANT.

Copies of this patent may be obtained for five cents each, by addressing the "Commissioner of Patents, Washington, D. C."